(12) United States Patent
Wilson et al.

(10) Patent No.: US 9,829,364 B2
(45) Date of Patent: Nov. 28, 2017

(54) METHOD OF SENSING VOLUME OF LOOSE MATERIAL

(71) Applicant: Raven Industries, Inc., Sioux Falls, SD (US)

(72) Inventors: Edwin Ernest Wilson, Round Rock, TX (US); John D. Preheim, Beresford, SD (US); Robert Leonard Nelson, Jr., Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 15/152,111

(22) Filed: May 11, 2016

(65) Prior Publication Data

US 2016/0252384 A1 Sep. 1, 2016

Related U.S. Application Data

(63) Continuation-in-part of application No. 14/837,894, filed on Aug. 27, 2015.
(Continued)

(51) Int. Cl.
*G01F 23/296* (2006.01)
*G01F 22/00* (2006.01)
(Continued)

(52) U.S. Cl.
CPC .............. *G01F 22/00* (2013.01); *A01D 41/00* (2013.01); *B60P 1/00* (2013.01); *G01S 17/42* (2013.01);
(Continued)

(58) Field of Classification Search
CPC ...... G01F 1/007; G01F 23/2962; G01F 22/00; G01F 23/0007; G01F 23/003
See application file for complete search history.

(56) References Cited

U.S. PATENT DOCUMENTS 5,063,776 A * 11/1991 Zanker .................... E21B 21/08
73/1.34
6,211,470 B1 * 4/2001 Beran ................... G01G 11/003
162/198
(Continued)

FOREIGN PATENT DOCUMENTS

JP 01073222 A * 3/1989
JP 02049120 A * 2/1990
(Continued)

OTHER PUBLICATIONS

"U.S. Appl. No. 14/837,894, Non Final Office Action dated Apr. 10, 2017", 8 pgs.

*Primary Examiner* — David A Rogers
(74) *Attorney, Agent, or Firm* — Schwegman Lundberg & Woessner, P.A.

(57) ABSTRACT

A system for determining a volume of loose material within a container comprises a support arm mountable above the container, an array of one or more sensors mounted to the support arm, wherein each of the one or more sensors is configured to determine a discrete distance measurement between the array and a surface of the loose material or a surface of the container, and at least one processor in communication with the array of one or more sensors, the processor configured to estimate a volume of the loose material in the container from discrete distance measurements determined by the one or more sensors of the array.

22 Claims, 7 Drawing Sheets

Related U.S. Application Data (60) Provisional application No. 62/042,882, filed on Aug. 28, 2014.

(51) Int. Cl.
*G01S 17/42* (2006.01)
*G01S 17/88* (2006.01)
*A01D 41/00* (2006.01)
*B60P 1/00* (2006.01)
G01F 23/292 (2006.01)
G01F 23/00 (2006.01)

(52) U.S. Cl.
CPC .......... *G01S 17/88* (2013.01); *G01F 23/0069* (2013.01); *G01F 23/292* (2013.01); *G01F 23/2928* (2013.01)

(56) References Cited

U.S. PATENT DOCUMENTS

| | | | | |
|---|---|---|---|---|
| 6,732,580 B2 * | 5/2004 | Dirksen | ............ | G01F 23/0023 73/149 |
| 8,091,421 B2 * | 1/2012 | Perl | ................... | G01F 23/2962 73/290 V |
| 8,881,588 B2 * | 11/2014 | Baer | ..................... | G01F 23/284 73/293 |
| 9,562,799 B2 * | 2/2017 | Bartov | ................ | G01F 23/0076 |
| 2002/0014116 A1 * | 2/2002 | Campbell | ............... | A01D 33/00 73/149 |
| 2003/0217596 A1 * | 11/2003 | Dirksen | .............. | G01F 23/0023 73/149 |
| 2004/0031335 A1 * | 2/2004 | Fromme | ................ | G01B 11/24 73/865 |
| 2007/0125162 A1 * | 6/2007 | Ghazi | ..................... | G01F 1/007 73/149 |
| 2009/0007627 A1 * | 1/2009 | Perl | ..................... | G01F 23/2962 73/1.73 |
| 2010/0101317 A1 * | 4/2010 | Ashrafzadeh | ....... | G01F 23/0061 73/149 |
| 2012/0036914 A1 * | 2/2012 | Landphair | .............. | A01C 7/081 73/1.16 |
| 2012/0221261 A1 * | 8/2012 | Fehrenbach | ............ | G01F 23/28 702/55 |
| 2014/0076047 A1 * | 3/2014 | Liu | ......................... | G01F 23/28 73/32 R |
| 2014/0208845 A1 * | 7/2014 | Zlotnick | ................ | G01F 22/00 73/290 V |
| 2016/0061643 A1 | 3/2016 | Wilson et al. | | |

FOREIGN PATENT DOCUMENTS

| | | | |
|---|---|---|---|
| JP | 02181612 A | * | 7/1990 |
| JP | 03048730 A | * | 3/1991 |
| JP | 05340783 A | * | 12/1993 |

* cited by examiner

METHOD OF SENSING VOLUME OF LOOSE MATERIAL

CROSS-REFERENCES TO RELATED APPLICATIONS

This patent application is a continuation-in-part (CIP) of application Ser. No. 14/837,894, filed on Aug. 27, 2015, entitled "METHOD OF SENSING VOLUME OF LOOSE MATERIAL," which is pending, and which claims the benefit of priority to U.S. Provisional Application No. 62/042,882, filed Aug. 28, 2014, entitled "METHOD FOR SENSING VOLUME AND CONTROLLING UNIFORM PLACEMENT IN LOOSE MATERIAL OFFLOADING OPERATIONS." the entirety of the disclosures of which are hereby incorporated by reference herein.

BACKGROUND

Loose solid material, such as grain, is often loaded into a large container, such as for storage or transportation of the loose material. For example, when grain is harvested in a large field, a harvesting machine, such as a combine, can unload the grain into a receiving container, such as one mounted on a tractor-pulled grain cart. The grain can then be loaded from the grain cart onto a large shipping container, such as can be pulled by a semi-trailer or a train. In these and other examples, the grain or other loose material can be loaded into the container via a feeding arm that is positioned over the open container so that the grain or other loose material can be fed into the container.

During the process of loading or other loose material into a container, it has typically been necessary for an operator to monitor the loading process and control the unloading arm accordingly in order to provide for complete and relatively uniform loading of the loose material into the container and to minimize loss of grain or loose material that is mistakenly loaded outside of the container. The operator can be required to observe and adjust the flow of the loose material and the relative position and orientation of the feeding arm relative to the container in order to achieve a relatively even fill of the loose material within the receiving container. In some situations, it can be difficult or even impossible for the operator to continuously monitor the loading of the loose material such as when grain is being loaded from a moving combine into a container on a moving grain cart where the operators must both drive the vehicles and monitor the loading of grain into the container. It can also be difficult to evenly fill a stationary receiving container with loose material, for example due to the large size of the receiving container.

SUMMARY

The present disclosure describes systems and methods for determining a volume of a loose particulate material within a large container, such as a shipping container. e.g., a semi-trailer or train car. The systems and methods can, for example, determine the volume of grain inside of a grain cart or grain trailer. The systems and methods described herein use an array of linear distance sensors mounted over the container, where each sensor of the array can determine a discrete distance measurement between the array and an upper surface of the loose particulate material. Each sensor can be oriented at a predetermined angle with respect to the other sensors, and the different angles and different distance measurements can be used to calculate the volume of the loose particulate material in the container.

The present disclosure describes a system for determining a volume of loose material within a container. In an example, the system comprises a support arm mountable above the container, an array of one or more sensors mounted to the support arm, wherein each of the one or more sensors is configured to determine a discrete distance measurement between the array and a surface of the loose material or a surface of the container, and at least one processor in communication with the array of one or more sensors, the processor configured to estimate a volume of the loose material in the container from discrete distance measurements determined by the one or more sensors of the array.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

DETAILED DESCRIPTION

In the following Detailed Description, reference is made to the accompanying drawings which form a part hereof. The drawings show, by way of illustration, specific examples in which the present systems and methods can be practiced. These examples are described in sufficient detail to enable those skilled in the art to practice, and it is to be understood that other embodiments can be utilized and that structural changes can be made without departing from the scope of the present disclosure. Therefore, the following Detailed Description is not to be taken in a limiting sense, and the scope of the present disclosure is defined by the appended claims and their equivalents.

This disclosure describes systems and methods for determining the volume of a loose particulate material within a container. The systems and methods can, for example, determine the volume of grain inside a grain cart or grain trailer. The systems and methods described herein use an array of linear distance sensors mounted over the container, where each sensor of the array can determine a discrete distance measurement between the array and an upper surface of the loose particulate material. Each sensor can be oriented at a predetermined angle with respect to the other sensors, and the different angles and different distance measurements can be used to calculate an overall approximation of the upper surface of the loose particulate material in the container, which in turn can be used to calculate the volume of the loose particulate material in the container.

Figure 1:
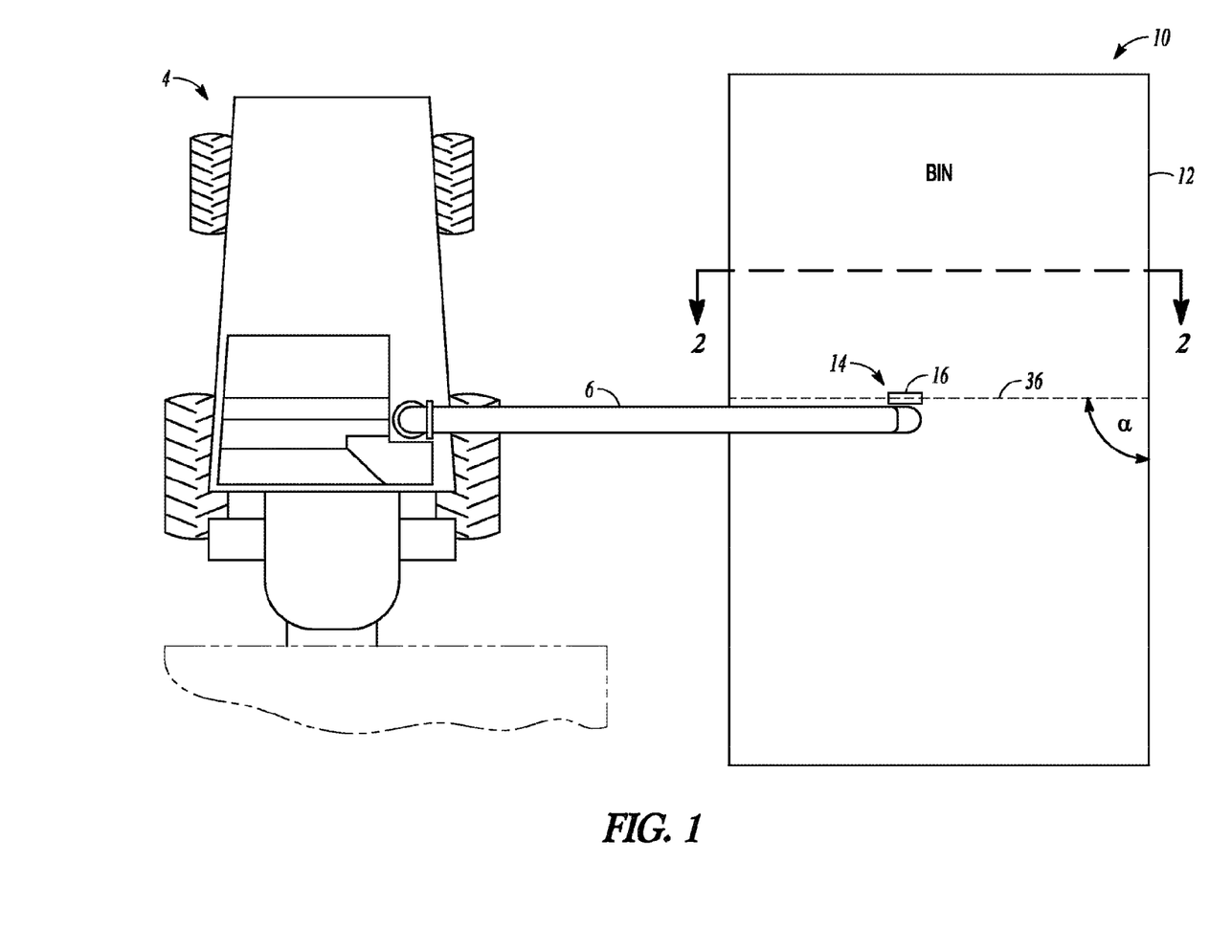
FIG. 1 is a top view of an example system for determining a volume of loose particulate material within a container, the system including an array of linear distance sensors mounted to a support arm that are configured to visually analyze the loose particulate material to determine its volume in the container.
Figure 2:
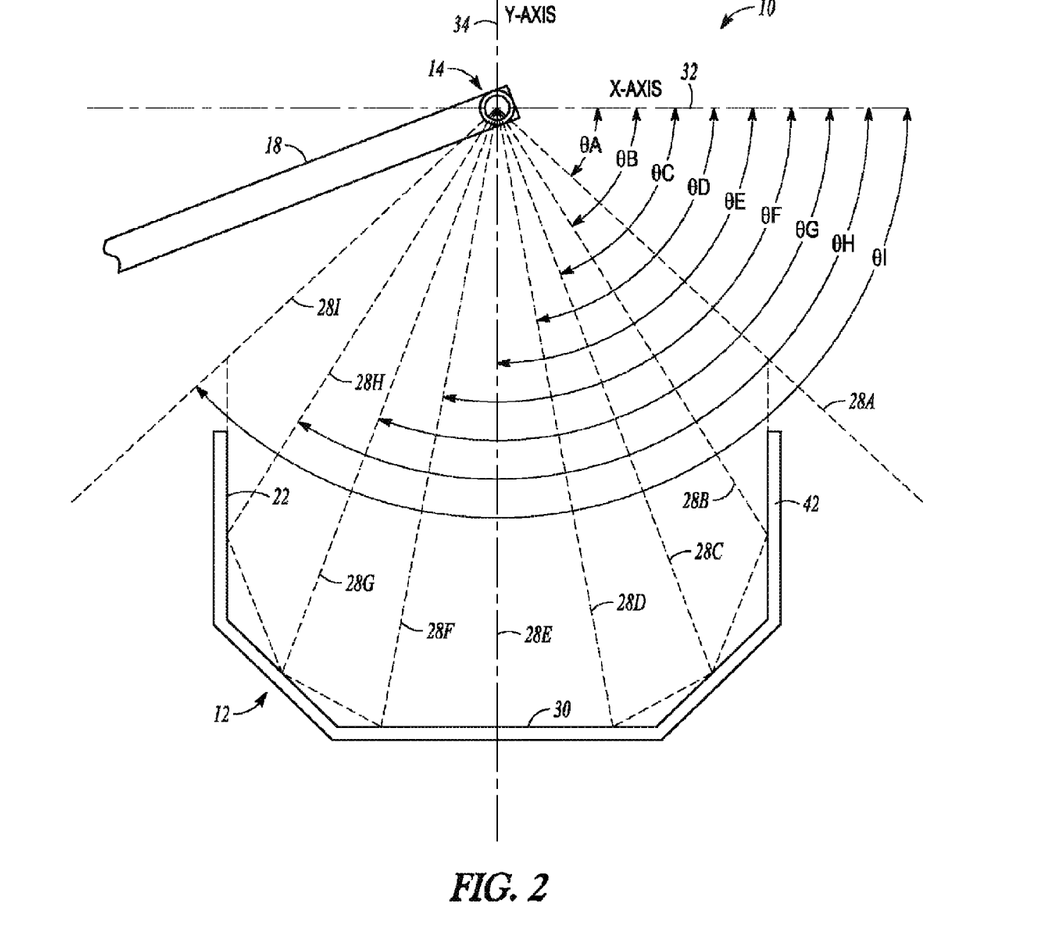
FIG. 2 is a cross-sectional side view of the example system taken along line 2-2 in FIG. 1.

FIG. 1 is a top view of an example system 10 configured to determine a volume of a loose particulate material 2 (FIG. 5) within a container 12. FIG. 2 shows a side cross-sectional view of the system 10. The container 12 can be a relatively large container for holding or transporting the loose particulate material 2, such as a shipping container or a storage container.

In the agricultural industry, there can be multiple operations that require grain transfer operations from one place to another, which can typically require the transfer of grain from one container to another container. For example, the transfer of grain from a grain cart into a tractor-trailer for transport to a storage facility or to the point of sale. Therefore, in an example, the loose particulate material 2 can be grain, such as harvested corn, wheat, soybeans, and the like, and the container 12 can be a container for storage of grain, such as a grain silo or hopper, or a container for transportation of grain, such as a grain cart or a semi-trailer or a train car configured for grain transport. FIG. 1 shows an example of the container 12 being a grain cart that can be moved alongside a grain harvesting machine, such as a combine 4, which can harvest the grain 2 and feed it to the container 12 via an unloading auger 6. For the sake of brevity, the loose particulate material 2 will be referred to as grain 2 for the remainder of this Detailed Description. A person of ordinary skill in the art will understand that when something is referred to as grain 2 can be another type of loose particulate material, including, but not limited to: gravel; sand; grain (including, but not limited to, wheat, barley, corn, cottonseed, etc.); corn cobs; hay; chopped or chipped wood; mulch; pump; harvested fruit, vegetables or nuts; polymer beads; fertilizer particles; coal; cement; carbon black; sawdust; sand salt.

A common problem associated with transferring grain 2 (or other particulate material) is controlling the amount of grain 2 transferred due to physical and legal maximum load limitations of the container 12. Another common problem is uniform distribution of the grain 2 into the container 12, particularly if one or both of the container 12 and the device unloading the grain 2 into the container 12 are moving with respect to one another. The system 10 can help to alleviate both problems through the use of an array 14 of sensors 16A, 16B, 16C, 16D, 16E, 16F, 16G, 16H, 16I (collectively referred to as "linear distance sensors 16" or "linear distance sensor 16"), best seen in the close-up side view of the array 14 in FIG. 3.

In an example, the sensors 16 are linear distance sensors 16. The term "linear distance sensor," as used herein, can refer to a sensor that can calculate a linear distance between the sensor and a surface. The term "linear distance," as used herein, can refer to a distance taken along a substantially straight line between the sensor and the surface, without interruption. In an example, the linear distance sensor can emit light, sound, or some other form of energy from the sensor toward the surface, and determines the linear distance based on the reflection of the energy off the surface back toward the sensor. Examples of linear distance sensors include sensors sold by LeddarTech Inc., Quebec City, Quebec, Canada, such as the IS16 Industrial LEDDAR Sensor, or 3D image sensors sold by IFM Efector, Inc., Exton, Pa. USA. Other types of sensors can be used in place of linear distance sensors, such as three-dimensional cameras, also referred to as stereo cameras, wherein the processor 24 can be configured to analyze image data captured by the cameras to determine a position of the grain 2.

The sensor array 14 can be mounted to a support arm 18 that is mounted over the top of the container 12, best seen in FIG. 2. The array 14 can be mounted to the support arm 18 so that the linear distance sensors 16 are directed downward toward the container 10. Each of the linear distance sensors 16 can be configured to determine a discrete linear distance measurement between the linear distance sensor 16 and a top surface 20 of the grain 2 or a surface of the container 12, such as the interior surfaces 22 within the container 12. The system 10 can also include at least one processor 24 that is in communication with the array 14 of linear distance sensors 16. The processor 24 can be configured to estimate a volume of the loose particulate material 2 in the container 12 based on the discrete linear distance measurements determined by each of the linear distance sensors 16 of the array 14.

In an example, the support arm 18 can include, or can be coupled to, a device for unloading the grain 2 into the container 12, such as the unloading auger 6 (FIG. 1). For example, the sensor array 14 can be oriented along a longitudinal axis 26 of the support arm 18 and the linear distance sensors 16 can be pointed generally down at the container 12. The linear distance sensors 16 of the array 14 can be angled relative to one another and to the support arm 18 to obtain multiple discrete distance measurements. The multiple discrete linear distance measurements can allow for the calculation by the processor 24 of a reasonable approximation of the cross-sectional area A of the container 12 as defined by the interior surfaces 22 of the container 12 and the top surface 20 of the grain 2 (described in more detail below). The length L of the container 12 can be known by the processor 24, such as by being stored in a memory (not shown) or entered into the system by a user. If it can be assumed that the grain 2 is generally uniformly spread out within the container 12, then the calculated cross-sectional area A can be integrated over the length L to obtain an estimate of the volume of grain 2 in the container.

In an example, an ideal or desired loaded cross-section area for the grain 2 can be determined based on the density of the grain 2 and a desired maximum load within the container 12. The unloading device can be controlled to uniformly or substantially uniformly distribute the grain 2 into the container 12 in order to achieve this ideal or desired loaded cross-section area. The unloading device can further be controlled based on real time cross-sectional area calculations using the measured linear distance measurements of the array 14 of linear distance sensors 16. In an example, the unloading device can be controlled automatically, such as by the processor 24, or manually by a user. In another example, the unloading device can be unmovable, e.g., fixed, and a user can control movement of the container 12 to achieve the ideal or desired loaded cross-sectional area, such as by moving a cart that is connected to the container 12 forward or backward relative to the unloading device.

FIGS. 2-5 show operation of the array 14 of linear distance sensors 16 and an example configuration of the system 10 for determining a volume of grain 2 in the container 12. Each linear distance sensors 16 can emit a beam of a sensing signal, such as a light signal (e.g., visible, infrared, etc.) or a sound signal. For example, as shown in the close-up end view of FIG. 3, the array 14 can comprise a set of nine linear distance sensors 16, wherein a first sensor 16A can emit a first sensing signal 28A, a second sensor 16B can emit a second sensing signal 28B, a third sensor 16C can emit a third sensing signal 28C, a fourth sensor 16D can emit a fourth sensing signal 28D, a fifth sensor 16E can emit a fifth sensing signal 28E, a sixth sensor 16F can emit a sixth sensing signal 28F, a seventh sensor 16G can emit a seventh sensing signal 28G, an eighth sensor 16H can emit an eighth sensing signal 28H, and a ninth sensor 16I can emit a ninth sensing signal 28I. Collectively the sensing signals 28A, 28B, 28C, 28D, 28E, 28F, 28G, 28H, 28I can be referred to herein as "sensing signals 28" or "sensing signal 28."

Figure 5:
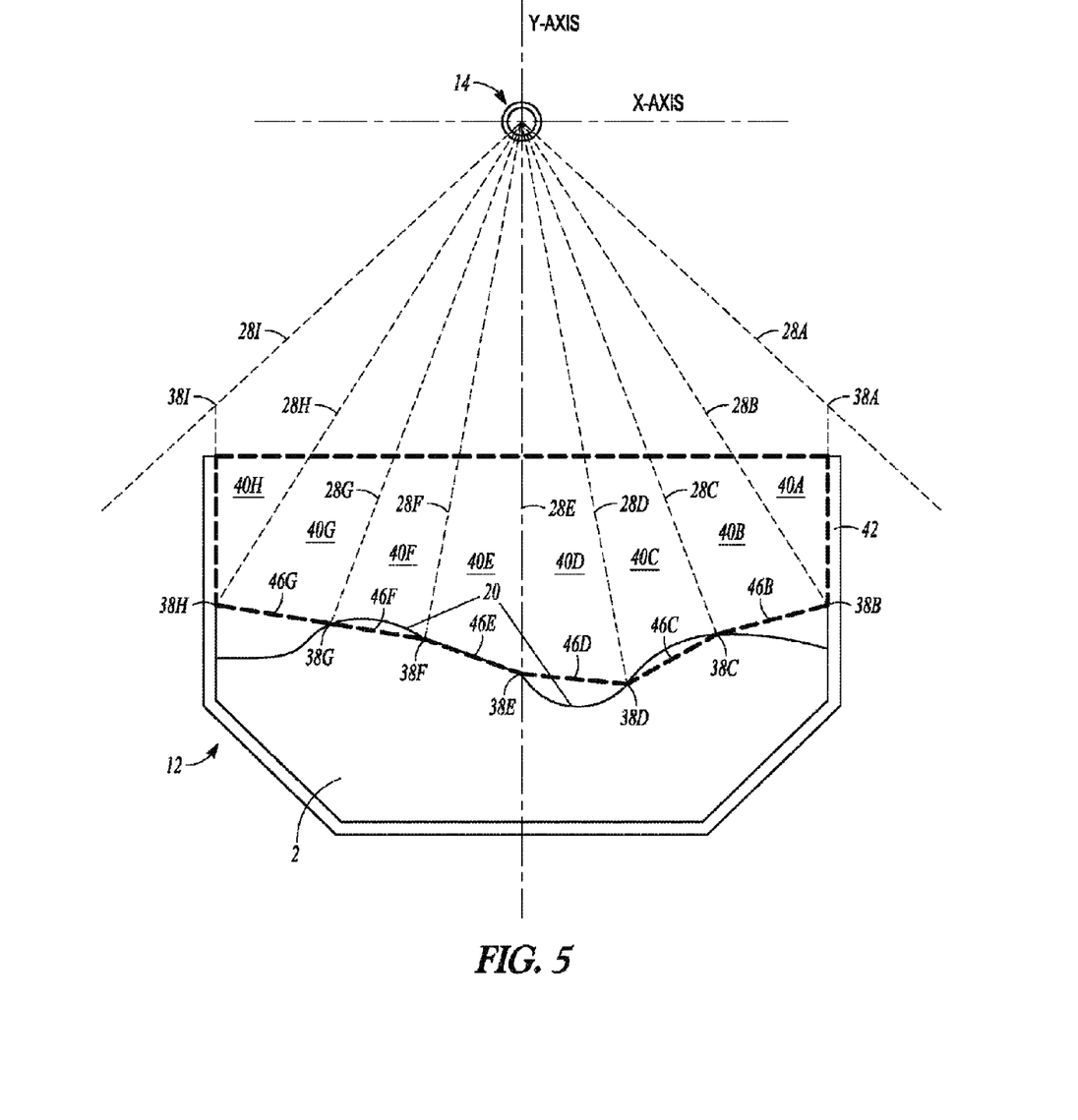

Each sensing signal 28 can be emitted from a corresponding linear distance sensor 16 such that the sensing signal 28 can be transmitted generally in a straight line until it contacts a surface, such as an interior side surface 22 or a bottom surface 30 of the container 12 (if the container 12 has a small enough amount of grain 2 therein), or a top surface 20 of the grain 2 (FIG. 5). The sensing signal 28 can reflect off the surface back toward the sensor 16 that emitted it, where the sensor 16 can receive the sensing signal 28 and determine a discrete distance measurement D of the distance between the sensor 16 and the surface upon which the sensing signal 28 was reflected. For example, the first sensor 16A can determine a first distance measurement $D_A$, the second sensor 16B can determine a second distance measurement $D_B$, the third sensor 16C can determine a third distance measurement $D_C$, the fourth sensor 16D can determine a fourth distance measurement $D_D$, the fifth sensor 16E can determine a fifth distance measurement $D_E$, the sixth sensor 16F can determine a sixth distance measurement $D_F$, the seventh sensor 16G can determine a seventh distance measurement $D_G$, the eighth sensor 16H can determine a eighth distance measurement $D_H$, and the ninth sensor 16I can determine a ninth distance measurement $D_I$. Further details of how the linear distance sensors 16 can be configured to make this determination of the discrete distance measurement is described in U.S. Pat. No. 8,619,241, issued on Dec. 31, 2013, the entire disclosure of which is incorporated herein by reference.

Figure 3:
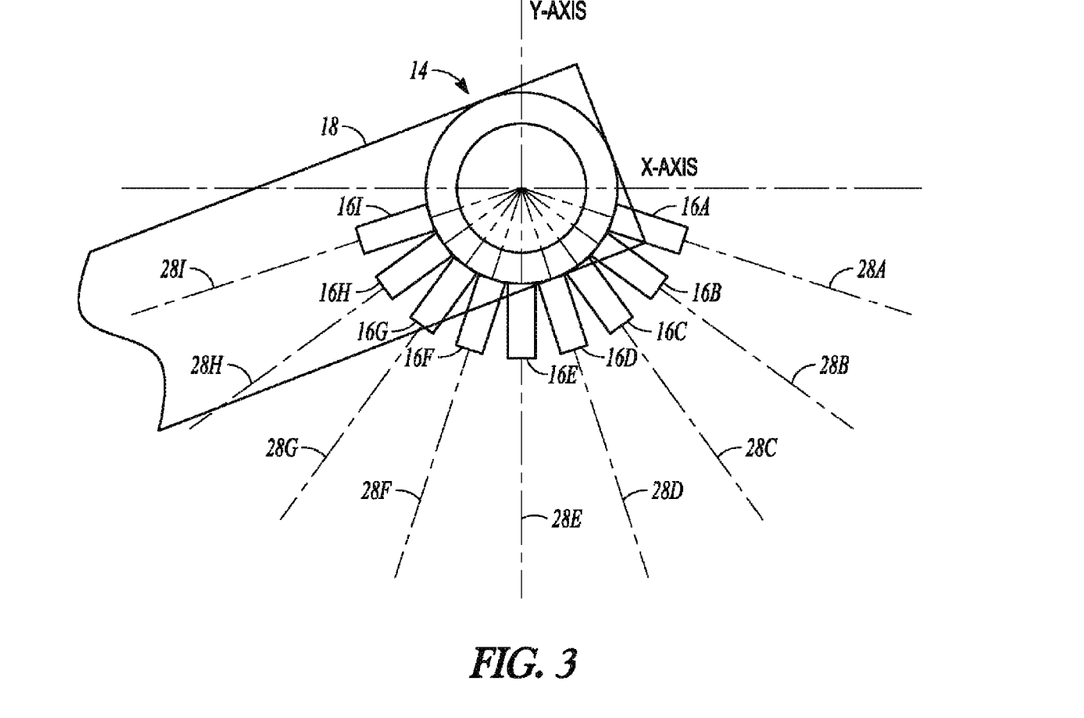
FIG. 3 is a close-up side view of the array of linear distance sensors mounted to the support arm.

Each sensor 16 can be positioned so that the sensing signal 28 emitted therefrom can form an angle θ with respect to a generally horizontal x-axis 32 that passes across the array 14. For example, the first sensing signal 28A forms a first angle $\theta_A$, the second sensing signal 28B forms a second angle $\theta_B$, the third sensing signal 28C forms a third angle $\theta_C$, and so on. A generally vertical y-axis 34 can also pass across the array 14 in a manner that is generally perpendicular to the x-axis 32. Both the x-axis 32 and the y-axis 34 can define a cross-sectional measurement plane 36, wherein the linear distance sensors 16 can be oriented so that the paths of the sensing signals 28 extend along or proximate to and substantially parallel with the cross-sectional measurement plane 36. As shown in FIGS. 2 and 3, the axes 32, 34 can be defined so that their intersection (i.e., the origin) is positioned at the array 14.

If the angles θ are known, they can be used, along with the distance measurements D determined by the linear distance sensors 16, to calculate the position where each sensing signal 28 contacts a surface (e.g., the top surface 20 of the grain 2 or the interior surface 22 of the container 12), referred to as the end point 38A, 38B, 38C, 38D, 38E, 38F, 38G, 38H, 38I (collectively "end points 38" or "end point 38") of the sensing signals 28. Each end point 38 can be defined as an x and y coordinate, that is a distance along the x-axis 32 and the y-axis 34. Each coordinate can be calculated by first realizing that the combination of the distance measurement D and the angle θ are a polar coordinate for each end point 38. The polar coordinates can be converted to Cartesian coordinates (i.e., x and y coordinates), via equations [1] and [2]:

$$x_i = D_i \cos(\theta_i) \quad [1]$$

$$y_i = D_i \sin(\theta_i) \quad [2]$$

where $x_i$ and $y_i$ are the corresponding x coordinate and y coordinate, respectively, for each end point 38, D is the distance measurement D for each corresponding sensing signal 28, and θ is the angle θ of each sensing signal 28 with respect to the x-axis 32, with i being A, B, C, D, E, F, G, H, and I, corresponding to each of the end points 38A, 38B, 38C, 38D, 38E, 38F, 38G, 38H, 38I, distance measurements $D_A$, $D_B$, $D_C$, $D_D$, $D_E$, $D_F$, $D_G$, $D_H$, $D_I$, and angle $\theta_A$, $\theta_B$, $\theta_C$, $\theta_D$, $\theta_E$, $\theta_F$, $\theta_G$, $\theta_H$, $\theta_I$.

The different angles θ of the sensing signals 28 can create a plurality of sections 40A, 40B, 40C, 40D, 40E, 40F, 40G, 40H (collectively referred to herein as "sections 40" or "section 40"), with each section 40 being defined on either side by one of the sensing signals 28 from one of the sensors 16. For example, a first section 40A can be bounded on one side by the first sensing signal 28A and on the other side by the second sensing signal 28B, a second section 40B can be bounded on its sides by the second sensing signal 28B and the third sensing signal 28C, the third section 40C can be bounded on its sides by the third sensing signal 28C and the fourth sensing signal 28D, the fourth section 40D can be bounded on its sides by the fourth sensing signal 28D and the fifth sensing signal 28E, the fifth section 40E can be bounded on its sides by the fifth sensing signal 28E and the sixth sensing signal 28F, the sixth section 40F can be bounded on its sides by the sixth sensing signal 28F and the seventh sensing signal 28G, the seventh section 40G can be bounded on its sides by the seventh sensing signal 28G and the eighth sensing signal 28H, and the eighth section 40H can be bounded on its sides by the eighth sensing signal 28H and the ninth sensing signal 28I. In an example, the sections 40 on each side, e.g., section 40A and 40H, can be bounded on the outside by a side wall 42 of the container 12, even if the outer sensing signals 28A and 28I actually pass over the top of the side wall 42. For example, the processor 24 can be configured to arbitrarily define the endpoints 38A and 38I to be vertically aligned with the side wall 42, even if the actual physical end point of the sensing signals 28A and 28I would be located outside of the side wall 42. If this definition of the endpoints for 38A and 38I is desired, the coordinates of each end point 38A, 38I can be determined as follows. First, the x-coordinate for each end point 38A, 38I can be known because it is the x-coordinate of the vertical side wall 42, which can be, for example, the same as the x-coordinate of end point 38B on one side and end point 38H on the other. Once the x-coordinate of each end point 38A, 38I is known, the y-coordinate can be determined by first determining what the distance measurement $D_A$, $D_I$ would be at each end point 38A, 38I, using equation [3]:

$$D_i = \frac{\cos(\theta_i)}{x_i} \quad [3]$$

Once the distance values $D_A$, $D_I$ are known, the y-coordinates for end points 38A, 38I can be calculated using equation [2].

Each section 40 can be bounded on the top by the array 14 (that is, by the coming together of adjacent sensing signals 28 at the array 14). Alternatively, the top of each section 40 can be defined by a maximum height 44 that the grain 2 can reach within the container 12, which can be defined as the actual height of the side walls 42 of the container 12 or as a height at which the weight of the grain 2 will be at the maximum loading weight for the container 12 (based on the known density of the grain 2), as shown in the example of FIG. 5. The bottom of each section 40 can be estimated by connecting an imaginary line between the end points 38 of the sensing signals 28 that bounded that section 40.

As described above, the location of the end points 38 can be defined in x,y coordinates using equations [1], [2], and [3]. By recording the location of the end points 38, the physical area of each section 40 can be calculated. The calculated areas of all the sections 40 can be summed to approximate an overall measured cross-sectional area $A_M$ that is not occupied by the grain 2, similar to the concept of mathematical integration. In an example, equation [4] shows one method of calculating the overall measured cross-sectional area $A_M$ of all the sections 40:

$$A_M = \frac{1}{2}\sum_{i=0}^{n-1} x_{i+1} * y_i - y_{i+1} * x_i \qquad [4]$$

where indices of x and y are the residuals modulo n.

Figure 4:
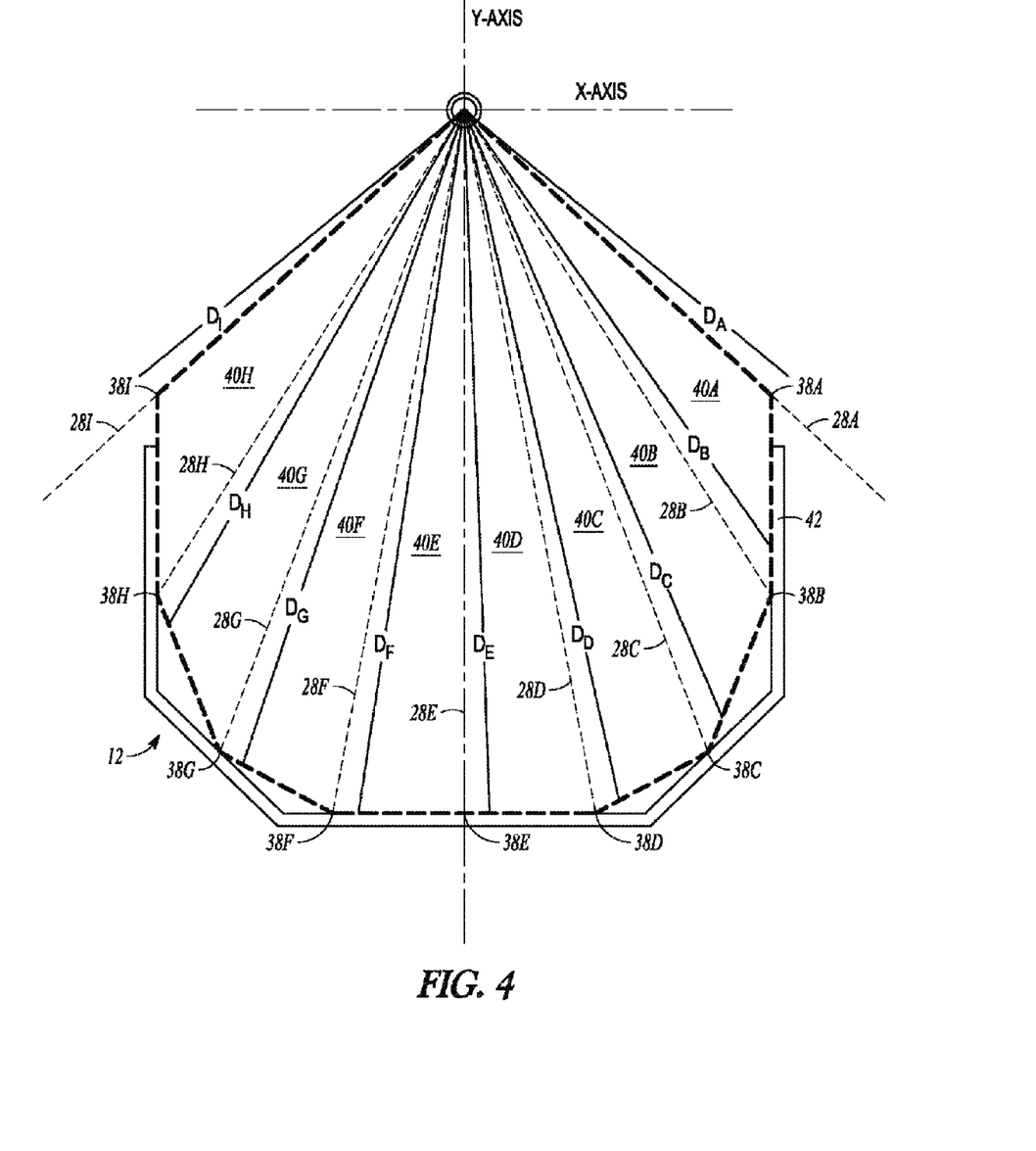
FIGS. 4 and 5 are cross-sectional side views of the example system showing the conceptual operation of the array of linear distance sensors in determining the volume of the loose particulate material in the container.

The overall cross-sectional area of the container 12 can be known. e.g., by scanning the container 12 with the array 14 prior to commencing filling with the grain 2 (FIG. 4). The cross-sectional area $A_G$ of the grain 2 within the measurement plane 36 can then be estimated by subtracting the overall calculated area of all the sections 40 from the overall cross-sectional area of the container 12. The calculated cross-sectional area $A_G$ of the grain 2 in the measurement plane 36 can then be used to estimate the overall volume of the grain 2 within the container 12. For example, if it can be assumed that the cross-sectional area of the grain 2 is generally uniform along the longitudinal axis of the container 12, and if the length $L_C$ of the container 12 (FIG. 1) is known, then the overall volume of the grain 2 can be estimated by multiplying the container length $L_C$ with the calculated cross-sectional area $A_G$ determined by scanning with the array 14 (described above), if the cross-sectional shape of the container 12 is uniform along the length.

As noted above, if only a single measurement plane 36 is scanned by the array 14, then the overall volume of the grain 2 can be accurately estimated if it can be assumed that the grain 2 was uniformly distributed along the length $L_C$ of the container 12. In another example, the array 14 can be configured to scan the container 12 in more than one measurement plane 36, e.g., if the grain 2 was not sufficiently uniformly distributed so that the top surface 20 of the grain 2 is not substantially level. The array 14 can be configured to scan more than one measurement plane 36 by, for example, having additional sets of linear distance sensors 16 that are directed toward different portions of the container 12. The system 10 can also include one or more additional arrays of linear distance sensors 16 that are positioned at a different point along the length $L_C$ of the container 12 from the array 14. In another example, only a single array 14 can be used, and the single array 14 can be configured to only scan a single measurement plane 36, but the array 14 can be configured to move with respect to the container 12, or vice versa, or both, so that the array 14 can be placed at a first position of the container 12 to scan a first measurement plane 36, and then the array 14 or the container 12, or both, can be moved to a second position of the container 12 so that the array 14 can scan a second measurement plane 36. The array 14 can be positioned at as many positions relative to the container 12 as desired in order to provide an acceptable approximation of the actual volume of the grain 2 within the container 12. If the linear distance sensors 16 are configured to provide a fast enough distance measurements D, and if the processor 24 is fast enough to provide substantially real time calculations of the area $A_G$ of the grain 2 within each measurement plane 36, then, in an example, the array 14 can be moved over the container 12, or the container 12 can be moved under the array 14, or both, and the processor 24 can substantially continuously calculate an almost infinite number of grain areas $A_G$ in an almost infinite number of measurement plane 36 in order to provide a more precise determination of the volume of grain 2 within the container 12.

FIG. 5 shows a cross-sectional view of the container 12 at a point in time where some grain 2 has been loaded into the container 12, but before the grain 2 has reached the maximum height 44 in the container 12. As shown, the grain 2 can form a top surface 20 that can be uneven. The unevenness of the top surface 20 is shown as being exaggerated in FIG. 5 to better demonstrate the operation of the system 10. At the point of time shown in FIG. 5, the system 10 can be controlled to scan the container 12 to determine an estimate of the volume of the grain 2. As discussed above, the plurality of linear distance sensors 16 of the array 14 can each emit a sensing signal 28, and the plurality of resulting sensing signals 28 can be used to define a plurality of sections 40. In the example of FIG. 5, the first section 40A can be bounded on the right side by the side wall 42 of the container 12, on the left by the second sensing signal 28B, and on top by the maximum height 44. The second section 40B can be bounded on the right side by the second sensing signal 28B, on the left by the third sensing signal 28C, on top by the maximum height 44, and on the bottom by a bottom boundary 46B that is an imaginary line extending from the end point 38B of the second sensing signal 28 and the end point 38C of the third sensing signal 28C. Each subsequent section 40C, 40D, 40E, 40F, 40G, and 40H can be defined in similar ways, each being bounded on either side by a sensing signal 28 or the side wall 42, on top by the maximum height 44, and on the bottom by a bottom boundary 46C, 46D, 46E, 46F, 46G (collectively referred to herein as "bottom boundaries 46" or "bottom boundary 46"). In the example shown in FIG. 5, sections 40A and 40H do not have bottom boundaries 46, but rather are bounded on their bottom sides by the sensing signals 28A and 28H.

The bottom boundaries 46 provide an estimate of the contour of the grain top surface 20, which can be irregular and hard to define with a discrete number of linear distance sensors 16. As shown in FIG. 5, the bottom boundaries 46, which, as noted above, are formed by drawing an imaginary line between the end points 38 of the sensing signals 28, can provide an overestimation of the amount of grain 2 in a particular section 40, e.g., as is the case with bottom boundaries 46B, 46D, and 46G for sections 40B, 40D, and 40G. The bottom boundaries 46 can also provide an underestimation of the amount of grain 2 in a particular section 40, e.g., as is the case with bottom boundaries 46C and 46F for sections 40C and 40F. It is believed, however, that due to the filling of grain 2 into the container 12, that the amount of error for a particular bottom boundaries 46 and section 40 will be relatively small, and that the overestimation of some sections 40 will tend to be balanced out by corresponding underestimations of other sections 40. However, if a particular system 10 is found to result in more variation of the top surface 20, and thus a greater precision is desired, then the array 14 to include more linear distance sensors 16, which in turn can result in the formation of more sections 40. As the number of sections 40 is increased, the precision of each individual section 40 will increase. Therefore, it can be desirable to balance the precision provided by the array 14 and the cost of using additional linear distance sensors 16 in the array 14 to increase precision. Alternatively, curve fitting can be used to reduce error in measuring the cross section without having to necessarily increase the number of sensors.

Figure 6:
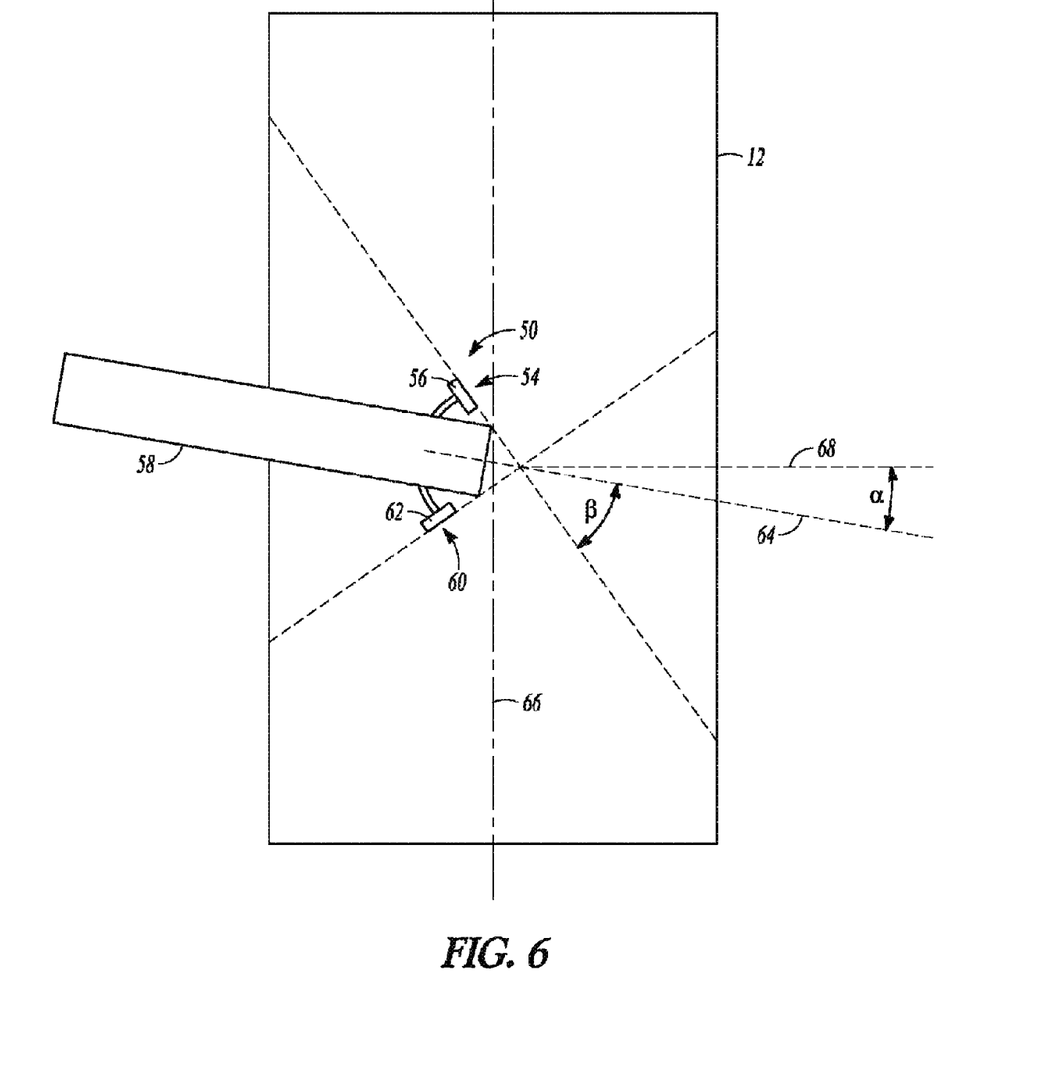
FIG. 6 is a top view of the system wherein the support arm on which the array of linear distance sensors is mounted is angled relative to the orientation of the container.

FIG. 6 shows a top view of another example system 50 that can be used to determine the volume of grain 2 in a container 12. The system 50 can be similar to the system 10. For example, the system 50 can include an array 54 comprising a set of a plurality of linear distance sensors 56 mounted to a support arm 58, wherein the support arm 58 supports the sensors 56 so that they are directed toward the container 12, e.g., by supporting the sensors 56 over the container 12. The sensors 56 of the array 54 can be configured to be similar to the sensors 16 of the array 14 described above with respect to the system 10 of FIGS. 1-5.

The system 50 can also include a secondary calibrating array 60 comprising a second set of a plurality of linear distance sensors 62 that can be configured to calibrate for a misaligned support arm 58, e.g., where a longitudinal axis 64 of the support arm 58 is not aligned to be generally perpendicular to the container 12, e.g., perpendicular to a longitudinal axis 66 of the container 12. As shown in FIG. 6, the longitudinal axis 64 can be misaligned from a perpendicular axis 68 of the container 12 by an angle α. If a system with only a single array of sensors was used, e.g., similar to the array 14 of the system 10 described above with respect to FIGS. 1-5, then the angular misalignment of angle α can result in measurements by the sensor array 14 being erroneously increased by a factor of $1/\cos(\alpha)$.

In order to account for the angle α of the support arm 58 both the primary array 54 and the secondary calibrating array 60 can also be angled relative to the longitudinal axis 64 of the support arm 58, e.g., with the primary array 54 located at an angle β relative to the longitudinal axis 64 and the secondary calibrating array 60, for example, located 900 relative to the primary array 54 (e.g., the angle γ between the secondary calibrating array 60 and the longitudinal axis 64 being 90–β). In an example, the two sensor arrays 54, 60 can be angled at a mirror image with respect to the longitudinal axis 64, e.g. with the primary array 54 being angled at a value of β and the secondary calibrating array 60 being angled at a value of –β. When there is no misalignment of the support arm 58, e.g., when angle α is zero, the perceived width P of the container 12 perceived by the primary array 54 will be the same as the perceived width Q perceived by the secondary calibrating array 60, as demonstrated by equations [5] and [6]:

$$P_A = \frac{w}{\cos(\beta)} \quad [5]$$

$$Q_A = \frac{w}{\cos(\beta)} \quad [6]$$

where w is the actual width of the container 12 and the subscript "A" refers to a situation where the support arm 58 is properly aligned with the container 12 so that the angle α is zero. When the angle α is positive, such as the angle α swept when a reference vector rotates in the clockwise (CW) direction referenced from the perpendicular axis 68, the width P perceived by the primary array 54 is larger than the width Q perceived by the secondary calibrating array 60, as demonstrated by equations [7] and [8]:

$$P_M = \frac{w}{\cos(\beta + \alpha)} \quad [7]$$

$$Q_M = \frac{w}{\cos(\beta - \alpha)} \quad [8]$$

where the subscript "M" refers to a situation where the support arm 58 is misaligned with the container 12 so that the angle α is a positive number. It will be noted that equations [7] and [8] apply only when β+α<90°. When β+α=90°, P becomes infinite. Equations [7] and [8] can be used to form the function F(α), shown in equation [9]:

$$F(\alpha) = \frac{Q_M}{P_M} = \frac{\cos(\beta + \alpha)}{\cos(\beta - \alpha)} \quad [9]$$

The function F(α) of equation [9] is independent of the actual width w of the container 12. The function F(α) can also be monotonic in a range, such as for α=0 to about 135°. The inverse of the function F(α) gives the value of α as a function of the ratio $P_M/Q_M$, which can be used to correct the individual measurements based on either $P_M$ or $Q_M$ using equation [10]:

$$w = P_M * \cos(\beta+\alpha) = Q_M * \cos(\beta-\alpha) \quad [10]$$

When α is negative, such as when the longitudinal axis 64 of the support arm 58 is rotated counterclockwise (CCW) from the perpendicular axis 68 of the container 12, the width $P_M$ perceived by the primary array 54 is smaller than the width $Q_M$ perceived by the secondary calibrating array 60. The correction of function F(α) can still be obtained in the same way by simply interchanging $P_M$ and $Q_M$ in equations [9] and [10], that is by computing F(α) by dividing the smaller measurement, such as the smaller measurement selected from the values $P_M$ and $Q_M$, by the larger measurement, such as the larger measurement selected from the values $P_M$ and $Q_M$, and then multiplying the larger measurement by the smaller correction factor, such as the smaller correction factor selected from the values cos(β+α) and cos(β–α).

In an example, the system 50 can follow an algorithm, e.g., a processor 68 can follow the following algorithm:
(1) Measure P using the primary array 54;
(2) Measure Q using the secondary calibrating array 60;
(3) Calculate F(α) as the quotient of the smaller of P and Q divided by the larger of P and Q;
(4) Find the value of α corresponding to the calculated value of F(α);
(5) Multiply the smaller width measurement by cos(β–α), that is multiply the smaller of P and Q by cos(β–α); or alternatively, multiply the larger width measurement by cos(β+α), that is multiply the larger of P and Q by cos(β+α).

Figure 7:
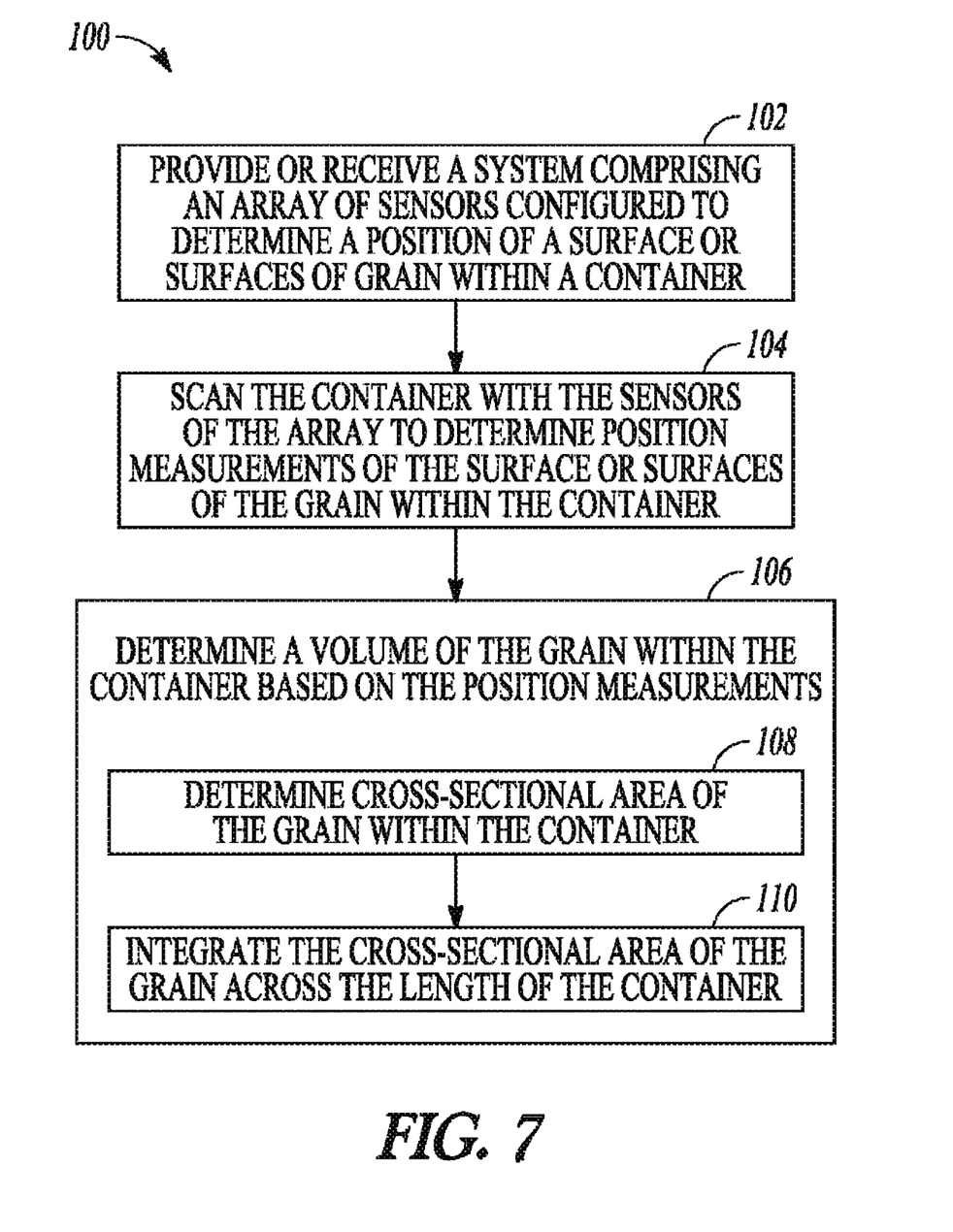
FIG. 7 is a flow diagram of an example method of determining a volume of grain or other loose particulate material within a container.

FIG. 7 shows an example flow chart of a method 100 for determining the volume loose particulate material, such as grain 2, in a container, such as the container 12. The method 100 can include, at 102, providing or receiving a system 10 comprising an array 14 of sensors 16 configured to determine a position of a surface, such as an interior surface 22 of the container 12 or a top surface 20 of the grain 2. In an example, the sensors 16 comprise linear distance sensors 16 each configured to determine a position of a particular location within the container 12. The method 100 can further include, at 104, scanning the container 12 with the sensors 16 of the array 14 to determine position measurements of the surfaces 20, 22 within the container 12, such as the distance measurements D described above.

At 106, the method 100 can include determining a volume of the grain 2 in the container 12 based on the position measurements D of the surfaces 20, 22 made by the sensors 16 of the array 14. In one example, shown in FIG. 7, determining the volume of the grain 2 can comprise: (a) at 108, determining a cross-sectional area $A_G$ of the grain 2 within the container 12, and (b) at 110, integrating the cross-sectional area of the grain 2 across the length $L_C$ of the container 12, such as by multiplying the cross-sectional area $A_G$ of the grain 2 by the length $L_C$ or moving one or both of the array 14 and the container 12 in order to continuously or substantially continuously scan a plurality of cross sections of the container 12, as described in more detail above.

In an example, determining the cross-sectional area $A_G$ of the grain 2 (108) can comprise determining a measured cross-sectional area $A_M$ of the container 12 that is not occupied by the grain 2. The measured cross-sectional area $A_M$ can be determined using the plurality of sensors 16 of the array 14, with each sensor 16 of the array 14 being responsible for measuring a data point that can be used to determine an area of one of a plurality of sections 40 that, when summed, can approximate the measured cross-sectional area $A_M$ that is not occupied by the grain 2. For example, as described above, each sensor 16 can emit a sensing signal 28 that can determine a distance measurement D from the array 14 to a point of contact with a surface 20, 22, designated as an end point 38. Each sensor 16 can also be oriented at a known angle θ relative to a horizontal axis. Using the concept of polar coordinates, the known angle θ, and the distance measurement D, the position of each end point 38 can be defined by Cartesian x- and y-coordinates, e.g., using equations [1], [2], and [3], described above. Once the coordinates of each end point 38 is known, the known geometry of each section 40 can be used to determine the overall measured cross-sectional area $A_M$ not occupied by the grain 2. The cross-sectional area $A_G$ of the grain 2 can be determined by subtracting the measured cross-sectional area $A_M$ from the total cross-sectional area of the container 12, which can have been measured ahead of time or can have been determined by scanning the container 12 with the array 14 before loading of the grain 2 is started.

Integrating the calculated cross-sectional area $A_G$ of the loose particulate material 2 across the length $L_C$ of the container 12 (110) can include multiplying the length $L_C$ by the calculated cross-sectional area $A_G$, e.g., determined as described above with respect to step 108. This method of integrating the calculated cross-sectional area $A_G$ can be performed if it can be assumed that the top surface 20 of the loose particulate material 2 is substantially level across the entire length $L_C$ of the container 12. In another example, integrating the calculated cross-sectional area $A_G$ across the length $L_C$ (110) can be performed by continuously or substantially continuously scanning the container 12 with the array 14 while moving one or both of the container 12 or the array 14, or both, so that the array 14 moves along the length $L_C$ of the container 12. The continuous or substantially continuous scanning of the container 12 can provide for a plurality of cross-sectional area $A_G$ calculations, which can be summed or averaged to determine an estimate of the overall volume of the loose particulate material 2 in the container 12.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A system for determining a volume of loose material within a container, the system comprising:
   a support arm mountable above the container;
   an array of one or more sensors mounted to the support arm, wherein each of the one or more sensors is configured to determine a discrete distance measurement between the array and an upper surface of the loose material or an inner surface of the container; and
   at least one processor in communication with the array of one or more sensors, wherein the at least one processor is configured to estimate a volume of the loose material in the container from discrete distance measurements determined by the one or more sensors of the array, wherein each of the sensors is oriented in a common plane so that the array of sensors produces distance measurements in the common plane, wherein the at least one processor is configured to estimate the volume of the loose material by estimating a cross-sectional area of the loose material within the container in the common plane according to the equation $$A_M = \frac{1}{2}\sum_{i=0}^{n-1} x_{i+1} * y_i - y_{i+1} * x_i$$

where $A_M$ is the estimated cross-sectional area in the common plane, n is the number of sensors, and $x_i$ and $y_i$, are the x and y coordinates of an end point measurement of each sensor of the array,
   wherein $x_i$ is calculated by the equation $x_i = D_i \cos(\theta_i)$ where $D_i$ is a distance measurement determined by each sensor of the array and $\theta_i$, is an angle of a sensing signal of each sensor with respect to a horizontal axis, and
   wherein $y_i$ is calculated by the equation $y_i = D_i \sin(\theta_i)$.

2. The system of claim 1, wherein each of the one or more sensors comprises a linear distance sensor directed toward the container.

3. The system of claim 1, wherein each of the one or more sensors is oriented at a corresponding discrete predetermined angle relative to the container in order to determine distance measurements between the array and the upper surface of the loose material within the container or the inner surface of the container.

4. The system of claim 1, wherein the at least one processor is further configured to integrate the estimated cross-sectional area along a length of the container to provide the estimate of the volume of the loose material.

5. The system of claim 1, further comprising at least one movement device for moving the position of the support arm relative to the container.

6. The system of claim 1, wherein the support arm comprises or is mounted to an unloading device for unloading the loose material into the container.

7. A system for determining a volume of loose material within a container, the system comprising:
   a support arm mountable above the container;
   a first array of one or more first sensors mounted to the support arm, wherein each of the one or more first sensors is configured to determine a discrete distance measurement between the first array and an upper surface of the loose material or an inner surface of the container;
   a second array of one or more second sensors mounted to the support arm, wherein each of the one or more second sensors is configured to determine a discrete distance measurement between the second array and the upper surface of the loose material or the inner surface of the container, wherein the second array is angled relative to the first array of first sensors by an angle; and
   at least one processor in communication with the first array of one or more first sensors and with the second array of one or more second sensors, wherein the at least one processor is configured to estimate a volume of the loose material in the container from discrete distance measurements determined by the one or more sensors of the array, and wherein the processor is configured to determine an orientation of the first array and the second array relative to the container based on the angle between the first array and the second array.

8. The system of claim 7, wherein the at least one processor is configured to estimate the volume of the loose material by estimating a cross-sectional area of the loose material within the container.

9. The system of claim 8, wherein each of the sensors is oriented in a common plane so that the array of sensors produces distance measurements in the common plane in order to estimate the cross-sectional area of the loose material in the common plane.

10. The system of claim 9, wherein the cross-sectional area in the common plane is estimated according to the equation:

$$A_M = \frac{1}{2}\sum_{i=0}^{n-1} x_{i+1} * y_i - y_{i+1} * x_i$$

where $A_M$ is the estimated cross-sectional area in the common plane, n is the number of sensors, and $x_i$ and $y_i$ are the x and y coordinates of an end point measurement of each sensor of the array, wherein $x_i$ is calculated by the equation:

$x_i = D_i \cos(\theta_i)$ where $D_i$ is a distance measurement determined by each sensor of the array and $\theta_i$ is an angle of a sensing signal of each sensor with respect to a horizontal axis, and wherein $y_i$ is calculated by the equation:

$y_i = D_i \sin(\theta_i)$.

11. The system of claim 7, wherein each of the one or more first sensors and each of the one or more second sensors comprises a linear distance sensor directed toward the container.

12. A method comprising the steps of:
   providing or receiving an array of one or more sensors configured to determine a position of a surface relative to the array;
   orienting each of the one or more sensors at a corresponding discrete predetermined angle relative to the container so that each of the one or more sensors is in a common plane so that the array of sensors produces distance measurements in the common plane;

scanning a container holding a loose particulate material with the one or more sensors of the array to determine position measurements of one or more surfaces within the container; and determining an estimate of the volume of the loose particulate material in the container based on the position measurements of the one or more surfaces within the container, wherein determining the estimate of volume comprises calculating an estimated cross-sectional area $A_M$ of the loose material in the common plane using the distance measurements in the common plane according to the equation $$A_M = \frac{1}{2}\sum_{i=0}^{n-1} x_{i+1}*y_i - y_{i+1}*x_i$$

where n is the number of sensors, and $x_i$ and $y_i$ are the x and y coordinates of an end point measurement of each sensor of the array, wherein $x_i$ is calculated by the equation $x_i = D_i \cos(\theta_i)$ where $D_i$ is a distance measurement determined by each sensor of the array and $\theta_i$ is an angle of a sensing signal of each sensor with respect to a horizontal axis, and wherein $y_i$ is calculated by the equation $y_i = D_i \sin(\theta_i)$.

13. The method of claim 12, wherein determining the estimate of the volume of the loose particulate material comprises:
estimating a cross-sectional area of the loose particulate material within the container; and
integrating the cross-sectional area across a length of the container.

14. The method of claim 13, wherein integrating the cross-sectional area of the loose particulate material comprises multiplying the cross-sectional area by the length of the container.

15. The method of claim 12, wherein scanning the container comprises each of the one or more sensors determining one or more discrete distance measurements between the array and an upper surface of the loose material or an inner surface of the container, and wherein determining the estimate of the volume comprises estimating the volume of the loose material in the container from the one or more discrete distance measurements determined by the one or more sensors of the array.

16. The method of claim 12, wherein scanning the container with the one or more sensors of the array comprises moving the position of the array relative to the container.

17. A method comprising the steps of:
providing or receiving an array of one or more sensors configured to determine a position of a surface relative to the array;
scanning a container holding a loose particulate material with the one or more sensors of the array to determine position measurements of one or more surfaces within the container; and
determining an estimate of the volume of the loose particulate material in the container based on the position measurements of the one or more surfaces within the container by estimating a cross-sectional area of the loose particulate material within the container and integrating the cross-sectional area across a length of the container,
wherein integrating the cross-sectional area of the loose particulate material comprises scanning a plurality of cross sections of the container and determining a corresponding cross-sectional area of the loose particulate material for each of the plurality of scanned cross sections and estimating the volume using the plurality of determined cross-sectional areas.

18. The method of claim 17, wherein providing or receiving the array of one or more sensors comprises orienting each of the one or more sensors at a corresponding discrete predetermined angle relative to the container.

19. The system of claim 18, wherein providing or receiving the array of one or more sensors comprises orienting each of the one or more sensors in a common plane so that the array of sensors produces distance measurements in the common plane, and wherein determining the estimate of volume comprises estimating the cross-sectional area of the loose material in the common plane using the distance measurements in the common plane.

20. The method of claim 19, wherein estimating the cross-sectional area in the common plane comprises calculating an estimated cross-sectional area $A_M$ according to the equation:

$$A_M = \frac{1}{2}\sum_{i=0}^{n-1} x_{i+1}*y_i - y_{i+1}*x_i$$

where n is the number of sensors, and $x_i$ and $y_i$ are the x and y coordinates of an end point measurement of each sensor of the array, wherein $x_i$ is calculated by the equation:

$x_i = D_i \cos(\theta_i)$ where $D_i$ is a distance measurement determined by each sensor of the array and $\theta_i$ is an angle of a sensing signal of each sensor with respect to a horizontal axis, and wherein $y_i$ is calculated by the equation:

$y_i = D_i \sin(\theta_i)$.

21. The method of claim 17, wherein scanning the container comprises each of the one or more sensors determining one or more discrete distance measurements between the array and an upper surface of the loose material or an inner surface of the container, and wherein determining the estimate of the volume comprises estimating the volume of the loose material in the container from the one or more discrete distance measurements determined by the one or more sensors of the array.

22. A method comprising the steps of:
providing or receiving a first array of one or more first sensors configured to determine a position of a surface relative to the first array;
providing or receiving a second array of one or more second sensors angled relative to the first array of linear distance sensors by a specified angle, wherein each of the one or more second sensors are configured to determine a position of the surface relative to the second array;
determining an estimate of the volume of the loose particulate material in the container based on the position measurements of the one or more surfaces within the container by the one or more first sensors and the one or more second sensors, wherein determining the estimate of the volume of the loose particulate comprises determining an orientation of the first array and the second array relative to the container based on the specified angle between the first array and the second array.

* * * * *

UNITED STATES PATENT AND TRADEMARK OFFICE
CERTIFICATE OF CORRECTION

PATENT NO. : 9,829,364 B2  
APPLICATION NO. : 15/152111  
DATED : November 28, 2017  
INVENTOR(S) : Wilson et al.

Page 1 of 2

It is certified that error appears in the above-identified patent and that said Letters Patent is hereby corrected as shown below:

In the Specification

In Column 1, Line 16, delete "OPERATIONS."" and insert --OPERATIONS,"-- therefor In Column 1, Line 46, delete "material" and insert --material,-- therefor In Column 1, Line 58, delete "container." and insert --container,-- therefor In Column 3, Line 55, delete "sensor."" and insert --sensor,"-- therefor In Column 3, Line 57, delete "distance."" and insert --distance,"-- therefor In Column 3, Line 65, delete "City." and insert --City,-- therefor In Column 4, Line 10, delete "10." and insert --12.-- therefor In Column 7, Line 31, delete "known." and insert --known,-- therefor In Column 9, Line 45, delete "900" and insert --90°-- therefor

In Column 12, Line 29, delete "A."" and insert --A,"-- therefor

In Column 12, Line 29, delete "B."" and insert --B,"-- therefor

In Column 12, Line 38, delete ""second."" and insert --"second,"-- therefor

In Column 12, Line 39, delete ""third."" and insert --"third,"-- therefor

Signed and Sealed this  
Fourteenth Day of April, 2020

Andrei Iancu  
*Director of the United States Patent and Trademark Office*

CERTIFICATE OF CORRECTION (continued)
U.S. Pat. No. 9,829,364 B2

In the Claims

In Column 13, Line 23, in Claim 1, after "equation", insert --:--

In Column 13, Line 31, in Claim 1, delete "$y_i$," and insert --$y_i$-- therefor In Column 13, Line 34, in Claim 1, after "equation", insert --:--

In Column 13, Line 38, in Claim 1, delete "$\theta_i$," and insert --$\theta_i$-- therefor In Column 13, Line 40, in Claim 1, after "equation", insert --:--

In Column 14, Line 45, in Claim 10, after "array,", insert --¶--

In Column 14, Line 51, in Claim 10, delete "y," and insert --$y_i$-- therefor

In Column 15, Line 13, in Claim 12, after "equation", insert --:--

In Column 15, Line 23, in Claim 12, after "equation", insert --:--

In Column 15, Line 30, in Claim 12, after "equation", insert --:--